United States Patent [19]

Fischer

[11] Patent Number: 4,895,702

[45] Date of Patent: Jan. 23, 1990

[54] CORROSION INHIBITOR COMPOSITIONS CONTAINING INHIBITOR PREPARED FROM AMINO SUBSTITUTED PYRAZINES AND EPOXY COMPOUNDS

[75] Inventor: Gordon C. Fischer, Angleton, Tex.

[73] Assignee: The Dow Chemical Company, Midland, Mich.

[21] Appl. No.: 131,979

[22] Filed: Dec. 11, 1987

Related U.S. Application Data

[63] Continuation-in-part of Ser. No. 787,559, Oct. 15, 1985, abandoned.

[51] Int. Cl.$^4$ .............................................. C23F 11/00
[52] U.S. Cl. ......................................... 422/7; 252/392
[58] Field of Search ............................. 252/392; 422/7

[56] References Cited

U.S. PATENT DOCUMENTS

| | | | |
|---|---|---|---|
| 3,040,050 | 6/1962 | Biel | 260/296 |
| 3,078,271 | 2/1963 | De Groote et al. | 260/247.5 |
| 3,332,997 | 7/1967 | Renner et al. | 260/570.7 |
| 3,629,104 | 12/1971 | Maddox, Jr. | 252/8.55 E |
| 3,758,421 | 9/1973 | Nikles, Jr. | 260/2 N |
| 3,758,493 | 9/1973 | Maddox, Jr. | 260/309.6 |
| 3,884,822 | 5/1975 | Gemmill, Jr. | 252/51.5 A |
| 4,102,804 | 7/1978 | Clouse et al. | 252/189 |

OTHER PUBLICATIONS

Nathan, Corrosion, vol. 9, 1953, pp. 195–202.
"New Corrosion Inhibitors Based on Fatty Materials–I. Epoxidized Fatty Materials Modified with Aliphatic Amines", B. M. Badran et al., *Corrosion Science*, vol. 22, No. 6, pp. 513–523, 1982.
CA 99:53471e (1983).
"New Corrosion Inhibitors Based on Fatty Materials–II. Epoxidized Fatty Materials Modified with Aromatic Amines" by Radran, Fattahl and Azim, *Corrosion Science*, vol. 22, No. 6, pp. 525–536, 1982.

*Primary Examiner*—Barry S. Richman
*Assistant Examiner*—Lyle Alfandary-Alexander

[57] ABSTRACT

Corrosion of metals in a corrosive atmosphere is reduced by use of a corrosion inhibitor prepared from (1) amino substituted pyrazine compounds such as aminopyrazine and (2) at least one epoxy compound such as the glycidyl ether of a mixture of alkanols having from 12 to 14 carbon atoms.

15 Claims, No Drawings

CORROSION INHIBITOR COMPOSITIONS CONTAINING INHIBITOR PREPARED FROM AMINO SUBSTITUTED PYRAZINES AND EPOXY COMPOUNDS

This application is a continuation-in-part of application Ser. No. 787,559 filed Oct. 15, 1985, now abandoned.

BACKGROUND OF THE INVENTION

The present invention concerns novel compositions prepared by reacting amino substituted nitrogen-containing heterocyclic compounds with epoxide compounds.

During the drilling and servicing of oil and gas wells, the metal tools and equipment associated therewith are susceptible to corrosion. It is therefore highly desirable to have corrosion inhibitors for the protection of these metal tools and equipment. The present invention provides corrosion inhibitors for use at both low and high temperatures. The deeper the wells, the higher the temperature; therefore there is a need for inhibitors suitable for use at both low and high temperatures.

SUMMARY OF THE INVENTION

One aspect of the present invention pertains to a corrosion inhibitor composition which comprises
(I) a corrosion inhibitor which comprises the product resulting from reacting
 (A) at least one pyrazine compound having at least one substituent —NHR' group wherein R' is hydrogen, a hydrocarbyl group having from 1 to about 8 carbon atoms or a pyrazinyl group represented by the formula

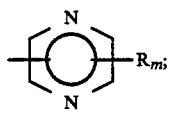

wherein each R is independently hydrogen, a hydrocarbyl group having from 1 to about 20 carbon atoms, —OH, —OR, —SH, or —SR; m has a value from 1 to 3; and
 (B) at least one epoxide compound selected from the group consisting of
  (1) monoglycidyl ethers of aliphatic and aromatic monohydroxyl-containing compounds, and
  (2) polyglycidyl ethers of aliphatic and aromatic compounds having two or more hydroxyl groups per molecule;
 wherein components (A) and (B) are present in quantities which provide a ratio of epoxy groups to —NH$_2$ groups of from about 0.25:1 to about 2:1; and
(II) a carrier for component (I); and
wherein said corrosion inhibitor composition comprises from about 0.1 to about 50, preferably from about 1 to about 40, more preferably from about 5 to about 20, percent by weight of component (I) based upon the combined weight of components (I) and (II) and from about 99.9 to about 50, preferably from about 99 to about 60, more preferably from about 95 to about 80, percent by weight of component (II) based upon the combined weight of components (I) and (II).

Another aspect of the present invention pertains to a process for reducing or preventing the corrosion of a metal composition subject to corrosion when in contact with corrosive liquid or gaseous atmospheres which process comprises contacting the surface of said metal composition which is in contact with a corrosive liquid or gaseous atmosphere with a corrosion inhibiting amount of a corrosion inhibitor composition comprising the product resulting from reacting
(A) at least one pyrazine compound having at least one substituent —NHR' group wherein R' is hydrogen, a hydrocarbyl group having from 1 to about 8 carbon atoms or a pyrazinyl group represented by the formula

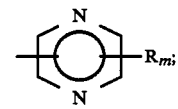

wherein each R is independently hydrogen, a hydrocarbyl group having from 1 to about 20 carbon atoms, —OH, —OR, —SH, or —SR; m has a value from 1 to 3; and
(B) at least one epoxide compound selected from the group consisting of
 (1) monoglycidyl ethers of aliphatic and aromatic monohydroxyl-containing compounds, and
 (2) polyglycidyl ethers of aliphatic and aromatic compounds having two or more hydroxyl groups per molecule;
wherein components (A) and (B) are present in quantities which provide a ratio of epoxy groups to —NH$_2$ groups of from about 0.25:1 to about 2:1.

DETAILED DESCRIPTION OF THE INVENTION

The corrosion inhibitors of the present invention are prepared by reacting an amino substituted pyrazine compound with a vicinal epoxy-containing compound or mixture of such compounds at a temperature of from about 0° C. to about 250° C., preferably from about 50° C. to about 200° C., most preferably from about 100° C. to about 150° C. for a time sufficient to complete the reaction, usually from about 0.5 hour to about 24 hours, preferably from about 2 hours to about 20 hours, most preferably from about 4 hours to about 8 hours.

A catalyst can also be employed to promote the reaction of epoxides with aminopyrazines. When a catalyst is employed, a strongly deprotonating catalyst such as, for example, sodium or potassium metal; sodium, potassium or lithium hydride; sodium, potassium or lithium amide; sodium, potassium or lithium diisopropylamide is usually employed. The catalyst can be conveniently employed in quantities which provide a ratio of moles of catalyst/epoxide equivalent of from about 0.25:1 to about 1.25:1, preferably from about 0.75:1 to about 1.15:1, most preferably from about 0.9:1 to about 1.1:1.

Suitable amino-substituted nitrogen-containing heterocyclic compounds which can be employed herein include those represented by the following formula I

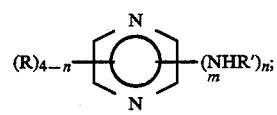

Formula I wherein each R is independently hydrogen, a hydrocarbyl group having from 1 to about 20, preferably from about 1 to about 10, most preferably from about 1 to about 4 carbon atoms; a halogen atom, an oxygen atom, an —OH, —OR, —SH or —SR group; R' is hydrogen, a hydrocarbyl group having from about 1 to 8, preferably from about 1 to about 6, most preferably from about 1 to about 2 carbon atoms; a pyrazinyl group represented by the formula

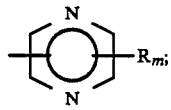

m has a value from 1 to 3; and n has a value from 1 to 4.

Particularly suitable such amino-substituted nitrogen-containing heterocyclic compounds include, for example, aminopyrazine, dipyrazinylamine, mono-, di- and trimethyl-aminopyrazine, ethyl-aminopyrazine, methylethyl-aminopyrazine, trichloro-aminopyrazine, mixtures thereof and the like.

Suitable epoxy compounds include, for example, monoglycidyl ethers of aliphatic and aromatic monohydroxyl-containing compounds, polyglycidyl ethers of aliphatic and aromatic compounds having two or more hydroxyl groups per molecule, and epoxides prepared by epoxidizing the double bond in mono- and poly ethyleneically unsaturated hydrocarbon compounds.

Suitable epoxy compounds include those represented by the following formulas II, III, IV, V, VI or VII

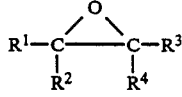
FORMULA II

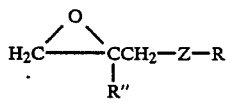
FORMULA III

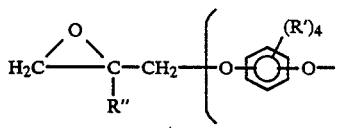
FORMULA IV

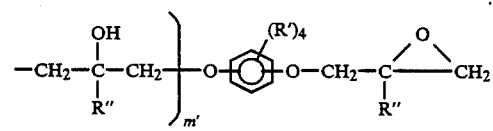

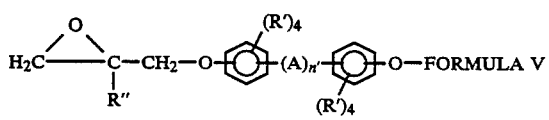
FORMULA V

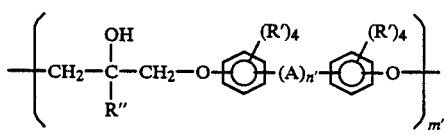

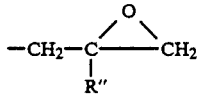
FORMULA VI

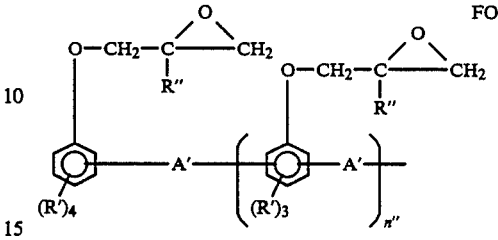

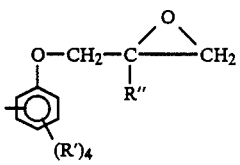

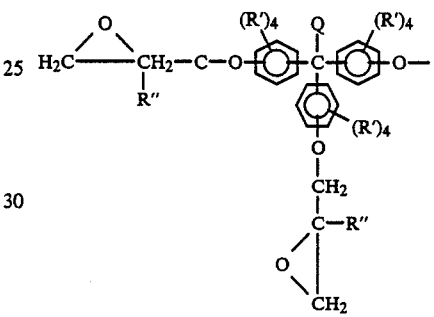
FORMULA VII

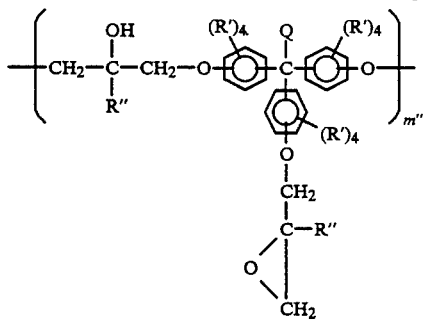

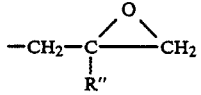

wherein A is a divalent hydrocarbon group having from 1 to about 12, preferably from 1 to about 6, more preferably from 1 to about 3, carbon atoms, —S—, —S—S—, —SO—, —SO$_2$—, —CO—, —O—CO—O—; A' is a divalent hydrocarbon group having from 1 to about 6, preferably from 1 to about 3, carbon atoms, more preferably a —CH$_2$— group; Q is hydrogen or an alkyl group having from 1 to about 10, preferably from 1 to about 6, more preferably from 1 to about 3, carbon atoms; R is a hydrocarbyl group having from about 6 to about 20 carbon atoms, preferably an alkyl group having from about 8 to about 20 carbon atoms; each R' is independently hydrogen, a halogen, or a hydrocarbyl group having from 1 to about 6, preferably from 1 to about 3, more preferably 1 carbon atom(s); R'' is independently hydrogen or a hydrocarbyl group having from 1 to about 3 carbon atoms; each $R^1$, $R^2$, $R^3$ and $R^4$ is independently a hydrogen or hydrocarbyl group having from 1 to about 20, preferably from about 1 to about 8, most preferably from about 1 to about 2 carbon atoms with the proviso that at least one of the $R^1$, $R^2$, $R^3$ and $R^4$ groups has at least 6 carbon atoms; Z is —$CH_2$—, —O—, —N— or —S—; x has a value of 4; m' and n" have an average value from about 0.01 to about 15, preferably from about 0.01 to about 6, more preferably from about 0.01 to about 2; m" has an average value from zero to about 3; and n' has a value of zero or 1.

Particularly suitable epoxide compounds which can be employed herein include, for example, glycidyl ethers of decanol, dodecanol, tetradecanol, hexadecanol, octadecanol; 1,2-epoxydecane, 1,2-epoxydodecane, 1,2-epoxytetradecane, 1,2-epoxyhexadecane, 1,2-epoxyoctadecane, mixtures thereof and the like.

If desired, the compositions of the present invention can be prepared in the presence of one or more solvents. Suitable such solvents include, for example, cyclic ethers, halogenated solvents, amides, furans, combinations thereof and the like. Particularly suitable solvents include, for example, tetrahydrofuran, methylene chloride, dimethylformamide, dimethylacetamide, dioxane, diethylether, hexamethylphosphoramide, 2-methoxyethanol, 2-ethoxyethanol, 2-isopropoxyethanol, 2-butoxyethanol, combinations thereof and the like.

The corrosion inhibitors of the present invention can be employed for use in either sour or sweet gas or oil applications.

The compositions of the present invention can be employed as a corrosion inhibitor in the same manner as are conventional corrosion inhibitors. Generally, the inhibitor product can be employed in corrosion inhibitor formulations as are known in the art. For example, the product can be dispersed or dissolved in a suitable carrier liquid or solvent such as water, alcohols, aromatic and aliphatic hydrocarbons, and the like, or mixtures thereof. Other additives include demulsifiers, water wetting agents, surfactants, viscosifiers, commingled gases, defoamers, other corrosion inhibitors such as polymeric materials and salts, organic and inorganic acids, iron control agents, sequestering and/or chelating agents, phosphates, quaternaries, amine salts, and the like. For example, surface active agents are used to assure complete dispersion of active ingredients throughout the corrosion inhibitor composition and thus provide a better contact of the corrosion inhibitor with the surface of the metal compound which is being protected. The corrosion inhibitors of this invention form films on metal surfaces at least as readily as those known film forming corrosion inhibitors.

The corrosion inhibitor of this invention is employed in a functionally effective amount. That is, any quantity of corrosion inhibitor which will provide some degree of inhibition of corrosion is sufficient. Typical amounts of corrosion inhibitor which are employed in an oil and/or gas well treatment can range from about one to about 2,000 ppm for continuous treatment or about 200 to about 50,000 ppm for squeeze treatment, based on the weight of corrosive well fluids in contact with the metal compositions which are protected. Amounts of corrosion inhibitor in excess of 50,000 ppm can provide additional corrosion inhibition but at increased expense.

The corrosion inhibitors of this invention are highly stable to high temperatures and high pressures. Typically, corrosion inhibitors are employed in applications where temperatures range from about 100° F. (37.7° C.) to in excess of about 500° F. (260° C.), depending upon the composition of the polymer product. The corrosion inhibitors of this invention are especially useful at temperatures ranging from 300° F. (148.8° C.) to about 450° F. (232.2° C.).

The corrosion inhibitors of this invention inhibit corrosion to metal compositions used in down hole applications, preferably in excess of 80 percent corrosion protection. The corrosion inhibitors advantageously inhibit corrosion to metal compositions at elevated temperatures exceeding 250° F. (121.1° C.) in oil and gas well applications. Useful applications include oil and/or gas well drilling, completion, workover, stimulation, transfer, processing and storage applications.

The following examples are illustrative of the present invention.

CORROSION TESTING, 175° F. (79.4° C.)

Corrosion inhibition of various samples was determined under conditions which simulate conditions that exist in oil and gas wells as follows. A brine solution containing 89.89 percent deionized water, 9.62 percent sodium chloride, 0.305 percent calcium chloride and a 0.186 percent hydrated magnesium chloride complex was prepared. This brine solution was saturated under carbon dioxide purge until a pH of 3.8 was achieved. The solution was treated with sodium persulfate to remove oxygen. The desired corrosion inhibitor was added to the solution. About 720 milliliters (ml) of this brine solution and 80 ml of kerosene (90% brine/10% kerosene) treated with sodium persulfate were charged into a 32-ounce bottle. To this charge was added enough hydrated sodium sulfide to generate a suitable amount of hydrogen sulfide (i.e., about 300 ppm hydrogen sulfide based on total fluids).

Metal coupons (12"×¼"×1/16", 304.8 mm×6.35 mm×1.59 mm) of 1020 carbon steel were degreased with an inhibited methylchloroform, acidized with 16 percent hydrochloric acid, washed and dried. Each coupon weighed about 19 g. A metal coupon was placed in the bottle containing the brine, kerosene and ingredients as previously described. The bottle was capped and acetic acid was injected into the bottle through a septum. The bottle was placed on a vertically rotating wheel held at 175° F. (79.4° C.) and the sample was rotated at 26 rpm for 24 hours. The coupons were removed from the bottle, cleaned, washed, dried and reweighed and the percent protection afforded them by the inhibitor is calculated as the percent protection by the following formula:

$$\text{percent protection} = 100 - \frac{\text{inhibitor coupon wt. loss}}{\text{blank coupon wt. loss}} \times 100$$

The weight loss is given to the nearest whole percent. The tests wherein no inhibitor is employed are for comparative purposes and are designated as blanks.

The corrosion rates are also determined in milliinches per year (mpy) corrosion rates by the following formula;

$$mpy = \frac{534 \text{ (Mg Weight Loss of Coupon)}}{d \times a \times t}$$

d = density of 1020 carbon steel = 7.86 g/ml
a = surface area (in.) of metal coupons
t = test time in hours

EXAMPLE 1

In a 100 ml round bottom flask equipped with a dropping funnel and magnetic stirrer was placed 2.00 g (0.02 mole) aminopyrazine, 50 ml anhydrous tetrahydrofuran and 0.48 g (0.02 mole) sodium hydride (from 0.8 g of 60% NaH in mineral oil). The mixture was allowed to stir under argon atmosphere, heated to 80° C. and 4.80 g (0.02 mole) (the monoglycidyl ether of a mixture of alkanols having from 12–14 carbon atoms commercially available from Proctor and Gamble as Epoxide 8) in 30 ml anhydrous tetrahydrofuran were added dropwise over 20 minutes. The reaction contents were then checked by TLC (thin layer chromatography) and the reactants appeared to have reacted to form the desired product. The mixture was allowed to stir for an additional hour at 80° C., neutralized with concentrated HCl, extracted with ether and the combined ether layers dried over magnesium sulfate. After filtration, the solvent was removed under vacuum to yield to the desired compound(s). 'HNMR spectroscopy supported the following structure:

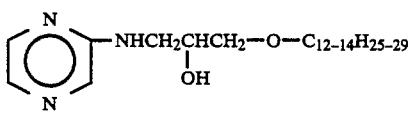

EXAMPLE 2

In a 4 ml thick walled glass vial equipped with a magnetic stir bar and septum cap was placed 100 mg (0.6 mmole) dipyrazinylamine, 36 mg (1.5 eq.) 60% NaH and 2 ml anhydrous dimethylformamide. Epoxide-8 (146 mg, 0.51 mmole) was then added and the mixture allowed to stir overnight at 130° C. TLC analysis revealed all of the starting materials to be consumed. The mixture was dissolved in ether and neutralized with buffer solution (pH 4). The layers were separated and the ether layer stripped under vacuum to yield a brown viscous oil. The product was analyzed by 'HNMR spectroscopy and the spectrum thus produced was consistent with the structure below:

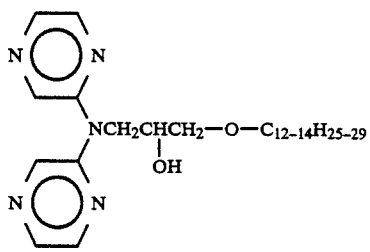

EXAMPLE 3

Corrosion inhibition of various samples was determined as follows. A brine solution containing 89.89 percent deionized water, 9.62 percent sodium chloride, 0.305 percent calcium chloride and a 0.185 percent hydrated magnesium chloride complex was prepared. This brine solution was saturated under carbon dioxide purge until a pH of 3.8 was achieved. The solution was treated with sodium persulfate to remove oxygen. About 800 milliliters (ml) of this brine solution and 80 ml of kerosene treated with sodium persulfate were charged into a 32-ounce bottle. To this charge was added enough hydrated sodium sulfide to generate a suitable amount of hydrogen sulfide as well as the desired amount of corrosion inhibitor.

Metal coupons of 1020 carbon steel were degassed with Chloroethene ™ solvent, acidized with 16 percent hydrochloric acid, washed and dried. Each coupon weighs about 19 g. A metal coupon was placed in the bottle containing the brine and kerosene as previously described. The bottle was capped and acetic acid was injected into the bottle through a septum. The bottle was placed on a shell wheel held at 175° F. and the sample was rotated at 26 rpm for 24 hours. The coupons were removed from the bottle, cleaned, and weighed.

The amount of corrosion of untreated coupons was compared to that of coupons which were tested in the presence of 100 ppm of each corrosion inhibitor sample. The results are presented in Table I.

TABLE I

| Sample | Description | mils/year | Corrosion Inhibition |
|---|---|---|---|
| 1 | No inhibitor | 56.4 | — |
| 2 | Sample of Example 1 | 6.2 | 81 |
| 3 | Sample of Example 2 | 6.6 | 87 |

What is claimed is:

1. A method for reducing or preventing the corrosion of a metal composition subject to corrosion in corrosive liquid or gaseous atmospheres which method comprises contacting the surface of said metal while in contact with a corrosive liquid or gaseous atmosphere with a corrosion inhibiting amount of a corrosion inhibitor composition comprising the product resulting from reacting (A) at least one pyrazine compound having at least one substituent —NHR' group wherein R' is hydrogen, a hydrocarbyl group having from 1 to about 8 carbon atoms or a pyrazinyl group represented by the formula

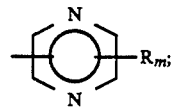

wherein each R is independently hydrogen, a hydrocarbyl group having from 1 to about 20 carbon atoms, —OH, —OR, —SH, or —SR; m has a value from 1 to 3; and (B) at least one epoxide compound selected from the group consisting of
(1) monoglycidyl ethers of aliphatic and aromatic monohydroxyl-containing compounds, and
(2) polyglycidyl ethers of aliphatic and aromatic compounds having two or more hydroxyl groups per molecule;

wherein components (A) and (B) are present in quantities which provide a ratio of epoxy groups to —NH$_2$ groups of from about 0.25:1 to about 2:1.

2. A method of claim 1 wherein said effective amount of corrosion inhibitor ranges from about 5 to about 2,000 ppm, based on the weight of said gaseous or liquid corrosive atmosphere.

3. A method of claim 2 wherein said corrosion inhibitor is contacted with a carrier liquid and subsequently with said gaseous or liquid corrosive atmosphere.

4. A method of claim 1 wherein
(a) components (A) and (B) are present in quantities which provide a ratio of epoxide groups to —NH groups of from about 0.75:1 to about 1.5:1;
(b) component (A) is represented by the following formula (I)

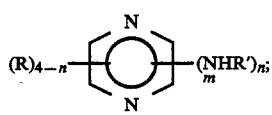

Formula I wherein each R is independently hydrogen, a hydrocarbyl group having from 1 to about 20 carbon atoms; a halogen atom, an oxygen atom, an —OH, —OR, —SH or —SR group; R' is hydrogen, a hydrocarbyl group having from about 1 to 8 carbon atoms; a pyrazinyl group represented by the formula

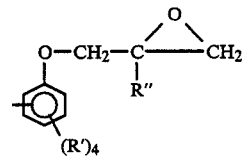

m has a value from 1 to 3; and n has a value from 1 to 4;
(c) component (B) is represented by the following formulas II, III, IV, V, VI or VII

FORMULA II $$R^1 - C - C - R^3$$
with O bridge, $R^2$, $R^4$ substituents

FORMULA III $H_2C - CCH_2 - Z - R$ (epoxide), with $R''$

FORMULA IV epoxide—$C(R'')$—$CH_2$—O—[phenyl $(R')_4$]—O—

—$CH_2$—C(OH)(R'')—$CH_2$—[O—phenyl$(R')_4$—O—$CH_2$—C(R'')—$CH_2$ epoxide]$_{m'}$ FORMULA V
$H_2C$—C(R'')—$CH_2$—O—phenyl$(R')_4$—$(A)_{n'}$—phenyl$(R')_4$—O—

—{$CH_2$—C(OH)(R'')—$CH_2$—O—phenyl$(R')_4$—$(A)_{n'}$—phenyl$(R')_4$—O—}$_{m'}$ —$CH_2$—C(R'')—$CH_2$ epoxide

FORMULA VI

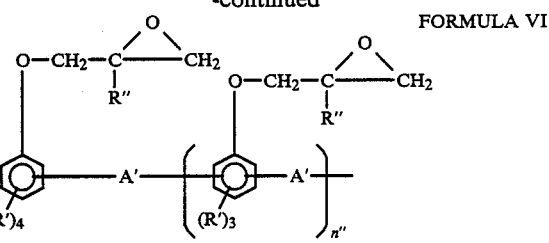

FORMULA VII

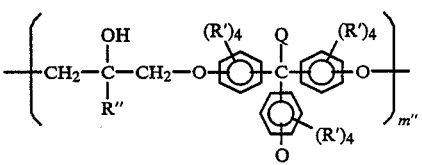

(continued structure with OH, $(R')_4$, Q, $(R')_4$, $CH_2$, C—R'', O, $CH_2$ groups and —$CH_2$—C(R'')—$CH_2$ epoxide terminus)

wherein A is a divalent hydrocarbon group having from 1 to about 12 carbon atoms, —S—, —S—S—, —SO—, —SO$_2$—, —CO—, —O—CO—O— or —O—; A' is a divalent hydrocarbon group having from 1 to about 6 carbon atoms; Q is hydrogen or an alkyl group having from 1 to about 10 carbon atoms; R is a hydrocarbyl group having from about 6 to about 20 carbon atoms; R' is independently hydrogen or a hydrocarbyl group having from 1 to about 6 carbon atoms or a halogen; R'' is independently hydrogen or a hydrocarbyl group having from 1 to about 3 carbon atoms; each $R^1$, $R^2$, $R^3$ and $R^4$ is independently hydrogen or hydrocarbyl group having from 1 to about 20 carbon atoms with the proviso that at least one of the $R^1$, $R^2$, $R^3$ and $R^4$ groups has at least 6 carbon atoms; Z is —$CH_2$—, —O—, —N— or —S—; m' and n'' have an average value from 0.01 to about 15; m'' has an average value from zero to about 3; and n' has a value of zero or 1.

5. A method of claim 4 wherein said effective amount of corrosion inhibitor ranges from about 5 to about 2,000 ppm, based on the weight of said gaseous or liquid corrosive atmosphere.

6. A method of claim 5 wherein said corrosion inhibitor is contacted with a carrier liquid and subsequently with said gaseous or liquid corrosive atmosphere.

7. A method of claim 4 wherein
(a) components (A) and (B) are employed in quantities which provide a ratio of epoxide groups to $-NH_2$ groups of from about 0.9:1 to about 1.1:1;
(b) in formulas II to VII, A is a divalent hydrocarbon group having from 1 to about 6 carbon atoms; A' is a divalent hydrocarbon group having from 1 to about 3 carbon atoms; Q is hydrogen or an alkyl group having from 1 to about 6 carbon atoms; R is an alkyl group having from about 8 to about 20 carbon atoms; each R' is independently hydrogen or a hydrocarbyl group having from 1 to about 3 carbon atoms or a halogen; each $R^1$, $R^2$, $R^3$ and $R^4$ is independently hydrogen or hydrocarbyl group having from 1 to about 8 carbon atoms with the proviso that at least one of the $R^1$, $R^2$, $R^3$ and $R^4$ groups has at least 6 carbon atoms; m' and n" have an average value from 0.01 to about 6; m" has an average value from zero to about 3; and n' has a value of 1; and
(c) component (I) is present in an amount of from about 1 to about 40 percent by weight based upon the combined weight of components (I) and (II) and component (II) is present in an amount of from about 99 to about 60 percent by weight based upon the combined weight of components (I) and (II).

8. A method of claim 7 wherein said effective amount of corrosion inhibitor ranges from about 5 to about 2,000 ppm, based on the weight of said gaseous or liquid corrosive atmosphere.

9. A method of claim 8 wherein said corrosion inhibitor is contacted with a carrier liquid and subsequently with said gaseous or liquid corrosive atmosphere.

10. A method of claim 7 wherein
(a) in formulas II to VII, A is a divalent hydrocarbon group having from 1 to about 3 carbon atoms; A' is a $-CH_2-$ group; Q is hydrogen or an alkyl group having from 1 to about 3 carbon atoms; each R' is independently hydrogen or a hydrocarbyl group having from 1 to about 3 carbon atoms or a halogen; and m' and n" have an average value from 0.01 to about 2; and
(b) component (I) is present in an amount of from about 5 to about 20 percent by weight based upon the combined weight of components (I) and (II) and component (II) is present in an amount of from about 95 to about 80 percent by weight based upon the combined weight of components (I) and (II).

11. A method of claim 10 wherein said effective amount of corrosion inhibitor ranges from about 5 to about 2,000 ppm, based on the weight of said gaseous or liquid corrosive atmosphere.

12. A method of claim 11 wherein said corrosion inhibitor is contacted with a carrier liquid and subsequently with said gaseous or liquid corrosive atmosphere.

13. A method of claim 10 wherein component (B) is an epoxide represented by formulas IV, V or VI.

14. A method of claim 13 wherein said effective amount of corrosion inhibitor ranges from about 5 to about 2,000 ppm, based on the weight of said gaseous or liquid corrosive atmosphere.

15. A method of claim 14 wherein said corrosion inhibitor is contacted with a carrier liquid and subsequently with said gaseous or liquid corrosive atmosphere.

* * * * *